(12) United States Patent
Watanabe et al.

(10) Patent No.: US 10,752,971 B2
(45) Date of Patent: Aug. 25, 2020

(54) HIGH STRENGTH SPRING, METHOD OF MANUFACTURING THE SAME, STEEL FOR HIGH STRENGTH SPRING, AND METHOD OF MANUFACTURING THE SAME

(71) Applicant: MITSUBISHI STEEL MFG. CO., LTD., Tokyo (JP)

(72) Inventors: Motoki Watanabe, Chiba (JP); Koki Minoguchi, Chiba (JP); Hiroyuki Oishi, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 15/749,959

(22) PCT Filed: Jun. 1, 2017

(86) PCT No.: PCT/JP2017/020501
§ 371 (c)(1),
(2) Date: Feb. 2, 2018

(87) PCT Pub. No.: WO2018/074003
PCT Pub. Date: Apr. 26, 2018

(65) Prior Publication Data
US 2019/0032165 A1    Jan. 31, 2019

(30) Foreign Application Priority Data

Oct. 19, 2016  (JP) .................. 2016-205535
Mar. 27, 2017  (JP) .................. 2017-061981
May 11, 2017  (JP) .................. 2017-095054

(51) Int. Cl.
*C21D 9/02*     (2006.01)
*C21D 1/25*     (2006.01)
(Continued)

(52) U.S. Cl.
CPC ............. *C21D 9/02* (2013.01); *C21D 1/25* (2013.01); *C22C 38/001* (2013.01);
(Continued)

(58) Field of Classification Search
CPC ........................................ C22C 38/02
(Continued)

(56) References Cited

U.S. PATENT DOCUMENTS 5,776,267 A    7/1998  Nanba et al.
6,322,747 B1  11/2001  Fukuzumi et al.
(Continued)

FOREIGN PATENT DOCUMENTS

CA    2079734    4/1993
CA    2188746    4/1997
(Continued)

OTHER PUBLICATIONS

English language machine translation of JP2016125119 to Kochi et al. Generated Jan. 24, 2019. (Year: 2019).*
(Continued)

*Primary Examiner* — Brian D Walck
(74) *Attorney, Agent, or Firm* — IPUSA, PLLC (57) ABSTRACT

A high strength spring containing, by mass %, C: 0.40 to 0.50%, Si: 1.00 to 3.00%, Mn: 0.30 to 1.20%, Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb: 0.005 to 0.150%, N: 0.0100 to 0.0200%, P: limited to be less than or equal to 0.015%, S: limited to be less than or equal to 0.010%, and the balance of Fe and inevitable impurities, wherein a Nb-compound including at least one of Nb-carbide, Nb-nitride and Nb-carbonitride is included, and wherein a V-compound including at least one of V-carbide and V-carbonitride that is precipitated around the Nb-compound is included.

4 Claims, 4 Drawing Sheets

(51) Int. Cl.

| | | |
|---|---|---|
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/00* | (2006.01) | |
| *F16F 1/02* | (2006.01) | |

(52) U.S. Cl.
CPC ............ *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *F16F 1/021* (2013.01)

(58) Field of Classification Search
USPC ........................................................ 148/335
See application file for complete search history.

(56) References Cited

U.S. PATENT DOCUMENTS

| | | |
|---|---|---|
| 2007/0125456 A1 | 6/2007 | Kochi et al. |
| 2007/0256765 A1 | 11/2007 | Kimura et al. |
| 2009/0020195 A1 | 1/2009 | Kubota et al. |
| 2015/0259771 A1 | 9/2015 | Vartanov |

FOREIGN PATENT DOCUMENTS

| | | | |
|---|---|---|---|
| CA | 2633153 | 7/2007 | |
| CN | 101541995 | 9/2009 | |
| CN | 105886930 | 8/2016 | |
| EP | 1985721 A1 * | 10/2008 | ........... C22C 38/002 |
| JP | H05-320827 | 12/1993 | |
| JP | 2001-131699 | 5/2001 | |
| JP | 2001-288539 | 10/2001 | |
| JP | 2016-125119 | 7/2016 | |
| KR | 10-0213542 | 8/1999 | |
| KR | 10-2007-0058345 | 6/2007 | |
| WO | 2006/022009 | 3/2006 | |

OTHER PUBLICATIONS

Russian Official Action for 2018106084 dated Jun. 27, 2018.
Canadian Official Action for 2,995,427 dated Jul. 30, 2018.
Korean Official Action for 10-2018-7005976 dated Jun. 21, 2018.
International Search Report for PCT/JP2017/020501 dated Aug. 29, 2017.
Chinese Official Action for 201780002753.8 dated Apr. 22, 2019.
Chinese Official Action for 201780002753.8 dated Oct. 8, 2019.
"Principle and Technology of Metallography Analysis", Ren Songzhan et al., Shanghai Scientific and Technical Literature Press, China, Aug. 2013, p. 423.
"Engineering Material and Mechanism Foundation", Zhou Qing et al., Northwestern Polytechnical University Press, China, Mar. 2015, p. 86.
"Titanium Based Material Manufacture", Yang Baoxiang et al., Metallurgical Industry Press, China, Jan. 2015, p. 475.

* cited by examiner

HIGH STRENGTH SPRING, METHOD OF MANUFACTURING THE SAME, STEEL FOR HIGH STRENGTH SPRING, AND METHOD OF MANUFACTURING THE SAME

BACKGROUND OF THE INVENTION

1. Field of the Invention

The present invention relates to a high strength spring and a method of manufacturing the same, and a steel for a high strength spring and a method of manufacturing the same.

2. Description of the Related Art

High strength springs are used for automobiles and the like. As the high strength spring has high strength, the high strength spring can be formed by a thin wire, and can contribute to lightening of an automobile, and also improve fuel consumption of the automobile. However, when the strength of the spring is increased, fatigue strength, hydrogen embrittlement resistance, delayed fracture resistance and the like under corrosive environment are lowered.

Thus, a steel for a spring disclosed in Patent Document 1 is configured to capture hydrogens entering the steel from external environment by a hydrogen trap site made of a precipitate containing V and the like to suppress diffusion of the hydrogen in the steel.

PATENT DOCUMENT

[Patent Document 1] Japanese Laid-open Patent Publication No. 2001-288539

In order to ensure hydrogen embrittlement resistance, it is effective to increase the number of precipitates that function as hydrogen trap sites. The precipitates contain V and the like.

However, there is a problem that the number of precipitates is not increased and coarse precipitates are formed just by increasing the content of an element such as V.

Further, in order to obtain high strength, it is effective to increase the content of C. However, if the content of C is too much, corrosion durability is lowered.

In order to obtain high strength with a small content of C, a tempering process at low temperature is effective. However, if a content of N is too much, low temperature temper brittleness is generated. As a result, as toughness is lowered, delayed fracture resistance is also lowered.

SUMMARY OF THE INVENTION

The present invention is made in light of the above problems, and mainly provides a high strength spring which has good hydrogen embrittlement resistance, corrosion durability and delayed fracture resistance.

According to an embodiment, there is provided a high strength spring containing, by mass %, C: 0.40 to 0.50%, Si: 1.00 to 3.00%, Mn: 0.30 to 1.20%, Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb: 0.005 to 0.150%, N: 0.0100 to 0.0200%, P: limited to be less than or equal to 0.015%, S: limited to be less than or equal to 0.010%, and the balance of Fe and inevitable impurities, wherein a Nb-compound including at least one of Nb-carbide, Nb-nitride and Nb-carbonitride is included, and wherein a V-compound including at least one of V-carbide and V-carbonitride that is precipitated around the Nb-compound is included.

According to the invention, a high strength spring and a steel for a high strength spring are provided which have good hydrogen embrittlement resistance, corrosion durability and delayed fracture resistance.

BRIEF DESCRIPTION OF THE DRAWINGS

FIG. 1-($a$) to FIG. 1-($e$) are SEM images of a part of a cross-section of a steel after a tempering process in example 1;

FIG. 2-($a$) to FIG. 2-($e$) are SEM images of another part of the cross-section of the steel after the tempering process in example 1;

DETAILED DESCRIPTION OF THE PREFERRED EMBODIMENTS

Hereinafter, embodiments of the present invention are described.

A high strength spring is used for, for example, a suspension spring of an automobile. Here, "high strength" means that its tensile strength is greater than or equal to 1800 MPa. The shape of a test piece used in a measurement of tensile strength is based on the shape of a No. 4 test piece described in Japan Industrial Standard (JIS Z2241).

The high strength spring may be a coil spring. The coil spring is manufactured by hot spring forming, cold spring forming or the like. According to the hot spring forming, after a wire is hot formed into a coil shape, a quenching process and a tempering process are performed. Further, according to the cold spring forming, after performing a quenching process and a tempering process on a wire, the wire is cold formed into a coil shape.

Here, although a coil spring is exemplified as the high strength spring in this embodiment, the high strength spring may be a leaf spring or the like. The embodiment of the high strength spring is not specifically limited. Further, the purpose for the high strength spring to be used is not limited to a suspension device of an automobile as well.

The high strength spring is made of a steel for a high strength spring. The steel for a high strength spring is obtained by performing a quenching process and a tempering process, and has a martensitic structure obtained by the quenching process. Before the quenching process, a pearlite structure is dominant, an austenite structure is dominant at quenching temperature, and the martensitic structure is dominant after the quenching process.

As long as the quenching process and the tempering process are performed on the steel for a high strength spring, its shape is not specifically limited. For example, for the hot spring forming, the steel for a high strength spring may have a shape of a spring (a coil shape, for example). Meanwhile, for the cold spring forming, the steel for a high strength spring may have the shape of the spring, or a shape (a stick shape, for example) before being shaped into the shape of the spring.

The steel for a high strength spring contains, by mass %, C: 0.40 to 0.50%, Si: 1.00 to 3.00%, Mn: 0.30 to 1.20%, Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb:

0.005 to 0.150% and N: 0.0100 to 0.0200%, wherein P is limited to be less than or equal to 0.015% and S is limited to be less than or equal to 0.010%, and contains the balance of Fe and inevitable impurities. Hereinafter, each component is described. For the description of each component, "%" means mass %.

C is an element effective for increasing strength of the steel. The content of C is 0.40 to 0.50%. When the content of C is less than 0.40%, strength necessary for a spring cannot be obtained. Meanwhile, when the content of C exceeds 0.50%, corrosion durability is lowered.

Si is an element effective for improving strength of the steel by being solid-dissolved in ferrite. The content of Si is 1.00 to 3.00%. When the content of Si is less than 1.00%, strength necessary for a spring cannot be obtained. Meanwhile, when the content of Si exceeds 3.00%, when the spring is hot formed, decarbonizing at a surface easily occurs and durability of the spring is lowered.

Mn is an element effective for improving hardenability of the steel. The content of Mn is 0.30 to 1.20%. When the content of Mn is less than 0.30%, an effect of improving the hardenability cannot be sufficiently obtained. Meanwhile, when the content of Mn exceeds 1.20%, toughness is deteriorated.

Ni is an element necessary for increasing corrosion durability of the steel. The content of Ni is 0.05 to 0.50%. When the content of Ni is less than 0.05%, an expected effect of increasing the corrosion durability of the steel cannot be sufficiently obtained. As Ni is expensive, an upper limit of the content of Ni is 0.50%.

Cr is an element effective for increasing strength of the steel. The content of Cr is 0.35 to 1.50%. When the content of Cr is less than 0.35%, an expected effect of increasing the strength of the steel cannot be sufficiently obtained. Meanwhile, when the content of Cr exceeds 1.50%, toughness is easily deteriorated.

Mo is an element that ensures hardenability of the steel, and increases strength and toughness of the steel. The content of Mo is 0.03 to 0.50%. When the content of Mo is less than 0.03%, an expected effect of adding Mo cannot be sufficiently obtained. Meanwhile, when the content of Mo exceeds 0.50%, the effect of adding Mo is saturated.

Cu is a component that increases corrosion durability. The content of Cu is 0.05 to 0.50%. When the content of Cu is less than 0.05%, an effect of increasing the corrosion durability cannot be sufficiently obtained. Meanwhile, when the content of Cu exceeds 0.50%, cracking and the like may occur during hot rolling.

Al is an element necessary as a deoxidizer of the steel and for adjusting an austenite grain size. The content of Al is 0.005 to 0.100%. When the content of Al is less than 0.005%, the crystal grain cannot be finely formed. Meanwhile, when the content of Al exceeds 0.100%, castability is easily lowered.

V is an element effective for increasing strength of the steel, and suppressing hydrogen embrittlement. The content of V is 0.05 to 0.50%. When the content of V is less than 0.05%, an expected effect of adding V cannot be sufficiently obtained. Meanwhile, when the content of V exceeds 0.50%, carbide that does not dissolve in austenite increases, and spring characteristics are deteriorated.

Nb is an element that increases strength and toughness of the steel by finely forming a crystal grain and precipitating fine carbide. Further, Nb is an element that contributes to fine dispersion of a V-compound including at least one of V-carbide and V-carbonitride (hereinafter, simply referred to as a "V-compound"), and increases hydrogen embrittlement resistance. The content of Nb is 0.005 to 0.150%. When the content of Nb is less than 0.005%, an expected effect of adding Nb cannot be sufficiently obtained. Meanwhile, when the content of Nb exceeds 0.150%, carbide that does not dissolve in austenite increases, and spring characteristics are deteriorated.

N is an element that forms AlN or NbN by bonding with Al or Nb, and has an effect in making austenite grain size fine. With this fine structure, toughness is improved. The content of N is 0.0100 to 0.0200%. When the content of N is greater than or equal to 0.0100%, a sufficient effect of improving toughness can be obtained. Meanwhile, if N is excessively added, bubbles may be generated at a surface of a steel ingot in solidification, or castability of the steel may be deteriorated, an upper limit of the content of N is 0.0200%.

P becomes a factor to lower an impact value by being precipitated at an austenite grain boundary to embrittle the grain boundary. In order to suppress this problem, the content of P is limited to be less than or equal to 0.015%.

S exists as an inclusion of MnS in the steel, and becomes a factor to lower fatigue life and corrosion durability. The inclusion means something that is already formed when the steel is molten. In order to decrease the inclusion, the content of S is limited to be less than or equal to 0.010%, preferably, less than or equal to 0.005%.

In order to finely disperse the V-compound as the hydrogen trap site, the steel for a high strength spring is manufactured by having the V-compound solid-dissolved in iron at the quenching temperature, and thereafter, precipitating the V-compound around the Nb-compound that is finely dispersed in the steel. Thus, the steel for a high strength spring includes the Nb-compound and the V-compound precipitated around the Nb-compound. As long as the V-compound is precipitated to be adjacent to the Nb-compound, the V-compound may not completely surround a periphery of the Nb-compound or may completely surround a periphery of the Nb-compound. In the steel for a high strength spring, the Nb-compound may exist inside the V-compound.

The Nb-compound is a precipitate that is precipitated in iron while a molten steel is being solidified. The Nb-compound includes at least one of Nb-nitride, Nb-carbide and Nb-carbonitride. The Nb-compound is finely dispersed in the steel before the quenching process, is not solid-dissolved in iron at the quenching temperature, and becomes a starting point of precipitation of the V-compound in quenching from the quenching temperature or in the tempering process. As the starting point of the precipitation of the V-compound, Nb-nitride that is more finely dispersed is preferably used compared with Nb-carbide and Nb-carbonitride.

As the V-compound exists in the steel as a coarse precipitate before the quenching process, the V-compound is solid-dissolved in iron at the quenching temperature, and thereafter, is precipitated from the Nb-compound as the starting point. As the Nb-compound is finely dispersed, the V-compound that is precipitated from the Nb-compound as the starting point can be finely dispersed. By finely forming the V-compound, the number of the V-compounds can be increased, and the steel for a high strength spring which has good hydrogen embrittlement resistance can be obtained.

The quenching temperature is set to be greater than or equal to 950° C. and less than or equal to 1000° C. in order for the V-compound to be solid-dissolved in iron at the quenching temperature. Such quenching temperature is higher than dissolution temperature at which the V-compound is solid-dissolved in iron, and when the content of V is less than or equal to 0.50% as described above, the V-compound is completely solid-dissolved in iron according to the calculation of a solubility product. As the quenching temperature is high temperature, in order to suppress the crystal grain to be coarse, appropriate amounts of Nb, Al, N and the like are added. With this, lowering of toughness can be suppressed, and lowering of delayed fracture resistance can be suppressed as well. Therefore, the steel for a high strength spring which has good delayed fracture resistance can be obtained.

A complex precipitate is formed by the Nb-compound and the V-compound precipitated around the Nb-compound. An average grain size of the complex precipitate may be greater than or equal to 0.01 µm and less than or equal to 1 µm. Further, the number of the complex precipitates per unit may be greater than or equal to 100/mm$^2$ and less than or equal to 100000/mm$^2$. The average grain size and the number per unit are measured using a SEM (Scanning Electron Microscope), for example. The average grain size is obtained by measuring each equivalent area diameter (diameter) of 100 complex precipitates, and calculating an average value of the measured values. The number per unit is obtained by measuring the number of the complex precipitates those exist at a region whose total area is 15 mm$^2$, and dividing the number by the total area.

In the steel for a high strength spring, in order to suppress lowering of corrosion durability, the content of C is limited to be less than or equal to 0.5%. Further, in order to ensure strength of the steel within a range where the content of C is less than or equal to 0.5%, the tempering temperature is limited to be less than 390° C. Therefore, the steel for a high strength spring which has good corrosion durability and high strength can be obtained. Here, in order to obtain a sufficient effect of improving toughness by the tempering process, a lower limit of the tempering temperature is set to be 250° C., more preferably, to be 300° C.

In order to sufficiently finely disperse nitride, the steel for a high strength spring includes 0.0100 to 0.0200% of N. In order to suppress low temperature temper brittleness due to N, the steel for a high strength spring contains appropriate amounts of Nb and Al, and N is detoxified by precipitating NbN and AlN instead of N. With this, lowering of toughness can be suppressed, and lowering of delayed fracture resistance can be suppressed as well. Thus, the steel for a high strength spring which has good delayed fracture resistance can be obtained.

EXAMPLES

Hereinafter, specific examples, comparative examples and the like are described.

Example 1

In example 1, a quenching process and a tempering process were performed on a steel having a composition as follows, and a rotating bending fatigue test piece and a hydrogen embrittlement test piece were manufactured by machining.

As the steel, a steel containing, by mass %, C: 0.44%, Si: 1.75%, Mn: 0.45%, Ni: 0.25%, Cr: 0.75%, Mo: 0.08%, Cu: 0.35%, Al: 0.023%, V: 0.25%, Nb: 0.020%, N: 0.0130%, P: limited to be less than or equal to 0.010%, S: limited to be less than or equal to 0.003%, and the balance of Fe and inevitable impurities, was used.

The quenching temperature was 950° C., and its retention time was 30 minutes. Oil cooling was used to cool the steel from the quenching temperature.

The tempering temperature was 360° C., and its retention time was 1 hour. Air cooling was used to cool the steel from the tempering temperature.

Vickers hardness of the steel after the tempering process was 590 Hv.

Figure 1:
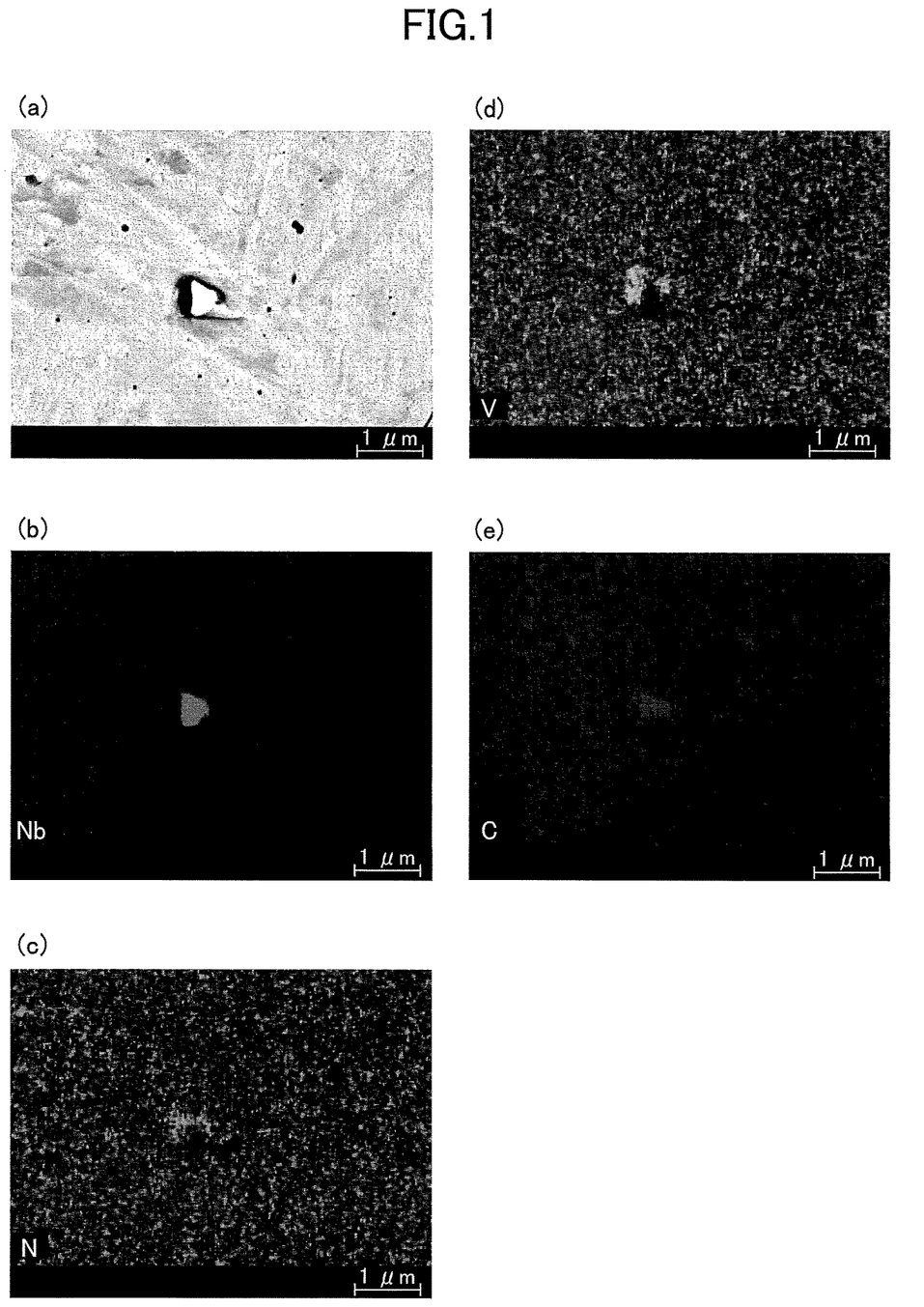

Further, the obtained steel was observed by an electron microscope. FIG. 1-(a) to FIG. 1-(e) are SEM images of a part of a cross-section of the steel after the tempering process in example 1, and FIG. 2-(a) to FIG. 2-(e) are SEM images of another part of the cross-section of the steel after the tempering process in example 1. FIG. 1-(a) and FIG. 2-(a) are backscattered electron images, FIG. 1-(b) and FIG. 2-(b) are characteristic X ray maps of Nb, FIG. 1-(c) and FIG. 2-(c) are characteristic X ray maps of N, FIG. 1-(d) and FIG. 2-(d) are characteristic X ray maps of V, and FIG. 1-(e) and FIG. 2-(e) are characteristic X ray maps of C. Here, in the backscattered electron images of FIG. 1-(a) and FIG. 2-(a), white portions indicate the Nb-compound, and black portions around the white portions indicate the V-compound. In the characteristic X ray maps of each element of FIG. 1-(b) to FIG. 1-(e) and FIG. 2-(b) to FIG. 2-(e), brightness of color indicates the amount of the element, and the brighter (more white) the color is, the greater the content of the element. As the backscattered electron images of FIG. 1-(a) and FIG. 2-(a) are images of reflected electrons of electron beam that rebound near the cross-section of the steel, those images express the size of observed surfaces as they are. Meanwhile, the characteristic X ray maps of FIG. 1-(b) to FIG. 1-(e) and FIG. 2-(b) to FIG. 2-(e) are images of characteristic X rays generated when the electron beam enters the steel from the cross-section of the steel. Further, a threshold value is provided for intensity of the characteristic X ray to be detected. Thus, the images of the characteristic X ray maps are different from the size that is observed at the observed surface.

As is apparent from the backscattered electron image of FIG. 1-(a), it was observed that a portion (black portion) in which concentration of V is higher than that at its periphery exists in the steel of example 1, and a portion (white portion) exists in the black portion in which concentration of Nb is higher than that at outside of the black portion. Further, from the characteristic X ray maps of FIG. 1-(b) to FIG. 1-(e), it was observed that a portion in which concentrations of N and C are high exists in each of the black portion and the white portion in FIG. 1-(a), and a portion in which concentration of N is high and a portion in which concentration of C is high at least overlap. Thus, it can be said that in the steel of example 1, at least V-carbonitride was precipitated such that to surround at least Nb-carbonitride after the tempering process.

Figure 2:
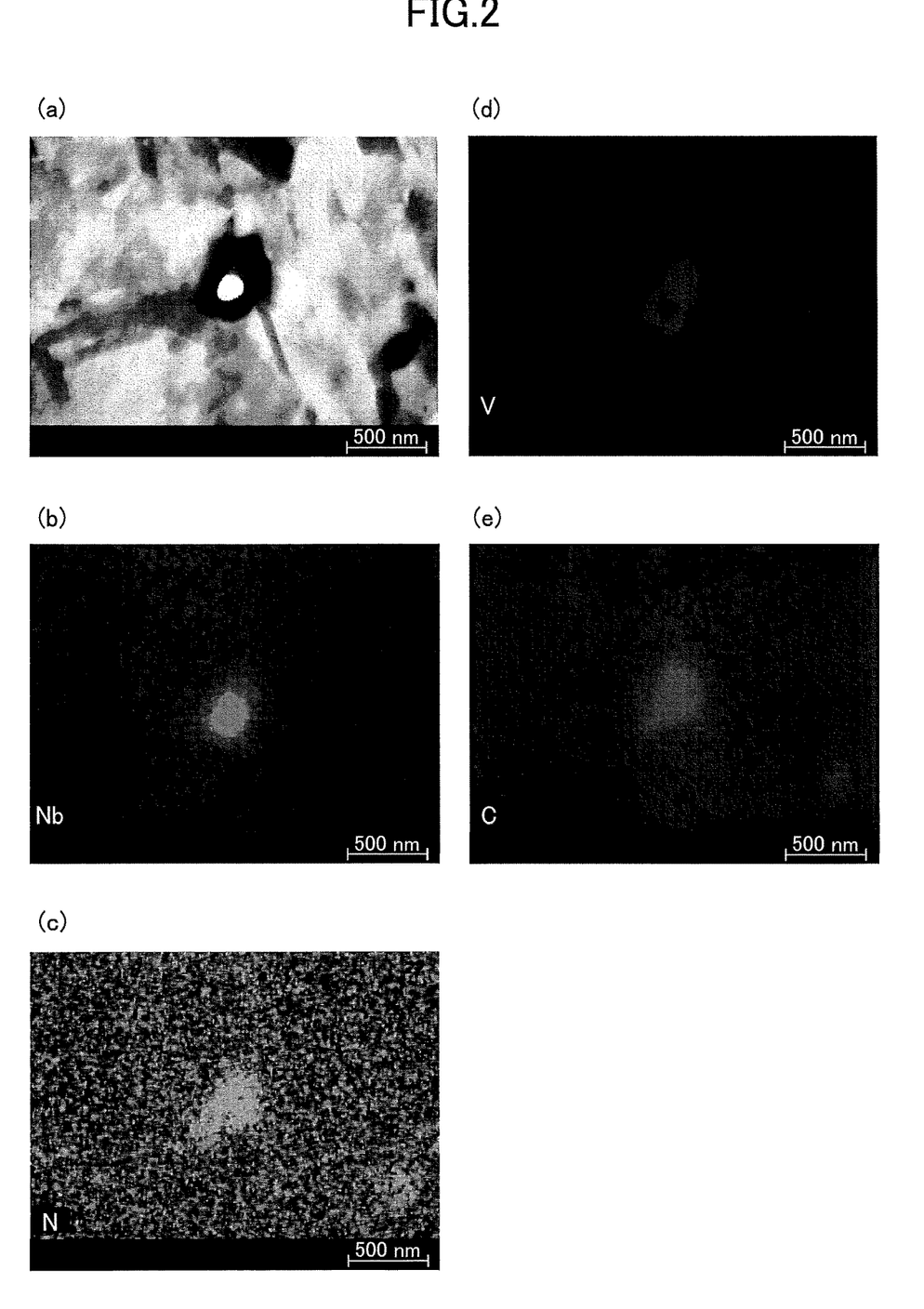

As is apparent from the backscattered electron image of FIG. 2-(a), at the other part of the steel of example 1, it was observed that a portion (black portion) in which concentration of V is higher than that at its periphery exists in the steel of example 1, and a portion (white portion) exists in the black portion in which concentration of Nb is higher than that at outside of the black portion. Further, from the characteristic X ray maps of FIG. 2-(b) to FIG. 2-(e), it was observed that a portion in which concentrations of N and C are high exists in each of the black portion and the white portion in FIG. 2-(a), and a portion in which concentration of N is high and a portion in which concentration of C is high at least overlap. Thus, it can be said that in the steel of example 1, at least V-carbonitride was precipitated such that to surround at least Nb-carbonitride after the tempering process after the tempering process.

Thus, it was confirmed that the V-compound was precipitated such that to surround the Nb-compound after the tempering process in the steel of example 1.

The shape of the test piece was based on the shape of a No. 1 test piece described in Japan Industrial Standard (JIS Z2274). The test piece has a constriction portion called a parallel part at a center portion of a round bar.

For the rotating bending fatigue test piece, the diameter of both end parts was 15 mm, the diameter of the parallel part was 8 mm, and the length of the parallel part was 20 mm.

For the hydrogen embrittlement test piece, the diameter of both end parts was 10 mm, the diameter of the parallel part was 4 mm, and the length of the parallel part was 15 mm.

Comparative Example 1

In comparative example 1, a quenching process and a tempering process were performed on a steel having a composition as follows, and a rotating bending fatigue test piece and a hydrogen embrittlement test piece were manufactured by machining.

As the steel, a steel containing, by mass %, C: 0.52%, Si: 1.50%, Mn: 0.45%, Ni: 0.26%, Cr: 0.80%, Mo: 0.09%, Cu: 0.12%, Al: 0.023%, V: 0.16%, Nb: 0.025%, N: 0.0120%, P: 0.010%, S: 0.009%, and the balance of Fe and inevitable impurities, was used.

The quenching temperature was 900° C., and its retention time was 30 minutes. Oil cooling was used to cool the steel from the quenching temperature.

The tempering temperature was 420° C., and its retention time was 1 hour. Air cooling was used to cool the steel from the tempering temperature.

Vickers hardness of the steel after the tempering process was 570 Hv.

The shapes of the test pieces were the same as those of the test pieces of example 1.

(Rotating Bending Fatigue Test)

In a rotating bending fatigue test, sine-wave stress was loaded on the test piece by rotating the test piece, to which a certain bending moment was applied, at 3000 rpm, and the repeated times until the test piece was broken were counted.

Figure 3:
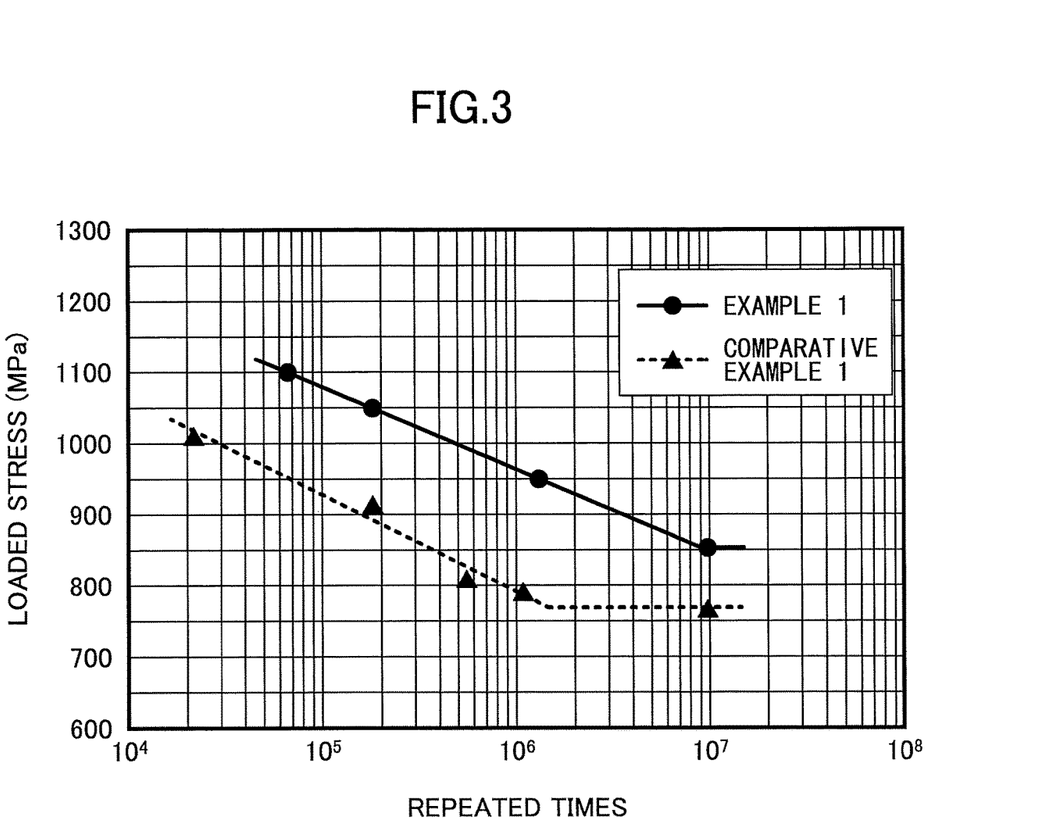
FIG. 3 is a view illustrating results of a rotating bending fatigue test of example 1 and comparative example 1.

FIG. 3 illustrates results of the rotating bending fatigue test of example 1 and comparative example 1. In FIG. 3, a solid line illustrates the result of the rotating bending fatigue test of example 1, and a broken line illustrates the result of the rotating bending fatigue test of comparative example 1.

As is apparent from FIG. 3, it was confirmed that the steel of example 1 had good bending fatigue strength compared with the steel of comparative example 1.

(Hydrogen Embrittlement Test)

In a hydrogen embrittlement test, maximum stress by which the test piece was not broken was measured, by soaking the parallel part of the test piece in electrolyte, charging hydrogens generated by an electric field of the electrolyte to the test piece for 48 hours, and thereafter, applying a load on the test piece while the parallel part was soaked in the electrolyte. As the electrolyte, aqueous solution containing 5% of ammonium thiocyanate at 50° C. was used. As a tester to apply the load on the test piece, a lever-operated constant load tester was used. The test period for confirming the maximum stress by which the test piece was not broken (hereinafter, referred to as "non-breaking stress") was 96 hours. This hydrogen embrittlement test was also a corrosion durability test and a delayed fracture resistance test, and the aqueous solution containing 5% of ammonium thiocyanate functioned as the electrolyte and also corrosion solution.

The non-breaking stress of the test piece of example 1 was 325 MPa, while the non-breaking stress of the test piece of comparative example 1 was 240 MPa. Thus, it was confirmed that the steel of example 1 had good hydrogen embrittlement resistance, corrosion durability and delayed fracture resistance compared with the steel of comparative example 1.

After the hydrogen embrittlement test, a diffusible hydrogen amount of the test piece was measured. The test piece was heated to increase temperature of the test piece at constant speed, the amount of hydrogen discharged from the test piece was continuously measured by a gas chromatography method, and the diffusible hydrogen amount was obtained from its profile.

The hydrogen discharged at temperature less than 300° C. is diffusible hydrogen, and the hydrogen discharged at temperature greater than or equal to 300° C. is non-diffusible hydrogen. Discharging of the diffusible hydrogen is almost finished before the temperature of the test piece reaches 220° C., and when the temperature of the test piece exceeds 400° C., the non-diffusible hydrogen is started to be discharged. The hydrogen captured at the hydrogen trap site is not discharged at the temperature less than 300° C.

The diffusible hydrogen amount of the test piece of example 1 was 0.36 mass ppm, while the diffusible hydrogen amount of the test piece of comparative example 1 was 1.87 mass ppm. Thus, it was confirmed that the steel of example 1 had more hydrogen trap sites and had good hydrogen embrittlement resistance compared with the steel of comparative example 1.

Example 2

In example 2, a quenching process and a tempering process were performed on a steel having a composition same as that of the steel of example 1, and a tensile strength test piece was manufactured by machining to conduct a tensile test.

The quenching temperature was 950° C., and its retention time was 30 minutes. Oil cooling was used to cool the steel from the quenching temperature.

The tempering temperature was 380° C. or 350° C., and its retention time was 1 hour. Air cooling was used to cool the steel from the tempering temperature.

The shape of the tensile test piece was based on the shape of a No. 4 test piece described in Japan Industrial Standard (JIS Z2241).

In the tensile test, tensile strength, 0.2% yield strength, elongation after fracture, reduction of area and the like were measured.

The tempering temperature, results of the tensile test and Vickers hardness are illustrated in Table 1.

TABLE 1

| TEMPERING TEMPERATURE [° C.] | TENSILE STRENGTH [MPa] | 0.2% YIELD STRENGTH [MPa] | BREAKING ELONGATION [%] | DRAWING [%] | HARDNESS [Hv] |
| --- | --- | --- | --- | --- | --- |
| 380 | 1973 | 1765 | 14 | 50 | 584 |
| 350 | 2055 | 1827 | 14 | 49 | 601 |

As is apparent from Table 1, it was confirmed that the steel of example 2 had high strength.

Example 3

In example 3, a steel having a composition same as that of the steel of example 1 and example 2 was hot formed into a coil shape. Thereafter, a quenching process, a tempering process, shot peening and setting were performed on the obtained component to manufacture a coil spring. Thereafter, a durability test of the obtained coil spring was conducted. The quenching temperature was 990° C., and its retention time was 20 minutes. Oil cooling was used to cool the coil spring from the quenching temperature. The tempering temperature was 360° C., and its retention time was 1 hour. Air cooling was used to cool the coil spring from the tempering temperature. Vickers hardness of the coil spring after the tempering process was 580 Hv.

Comparative Example 2

In comparative example 2, a steel having a composition same as that of the steel of comparative example 1 was hot formed into a coil shape similarly as example 3, and a component having a shape same as that of example 3 was obtained. Thereafter, a quenching process, a tempering process, shot peening and setting were performed on the obtained component, and a coil spring having the same shape as that of example 3 was manufactured. Thereafter, a durability test of the obtained coil spring was conducted. The quenching temperature was 940° C., and its retention time was 20 minutes. Oil cooling was used to cool the coil spring from the quenching temperature. The tempering temperature was 420° C., and its retention time was 1 hour. Air cooling was used to cool the coil spring from the tempering temperature. Vickers hardness of the coil spring after the tempering process was 560 Hv.

(Durability Test)

In the durability test, stress was repeatedly loaded to the coil spring by various stress amplitudes while setting the average stress to be 735 MPa, and the repeated times until the coil spring was broken were counted. Here, in example 3, the stress amplitudes were 735 MPa±620 MPa (maximum stress: 1355 MPa, minimum stress: 115 MPa) and 735 MPa±550 MPa (maximum stress: 1285 MPa, minimum stress: 185 MPa). In comparative example 2, the stress amplitudes were 735 MPa±525 MPa (maximum stress: 1260 MPa, minimum stress: 210 MPa) and 735 MPa±500 MPa (maximum stress: 1235 MPa, minimum stress: 235 MPa).

Figure 4:
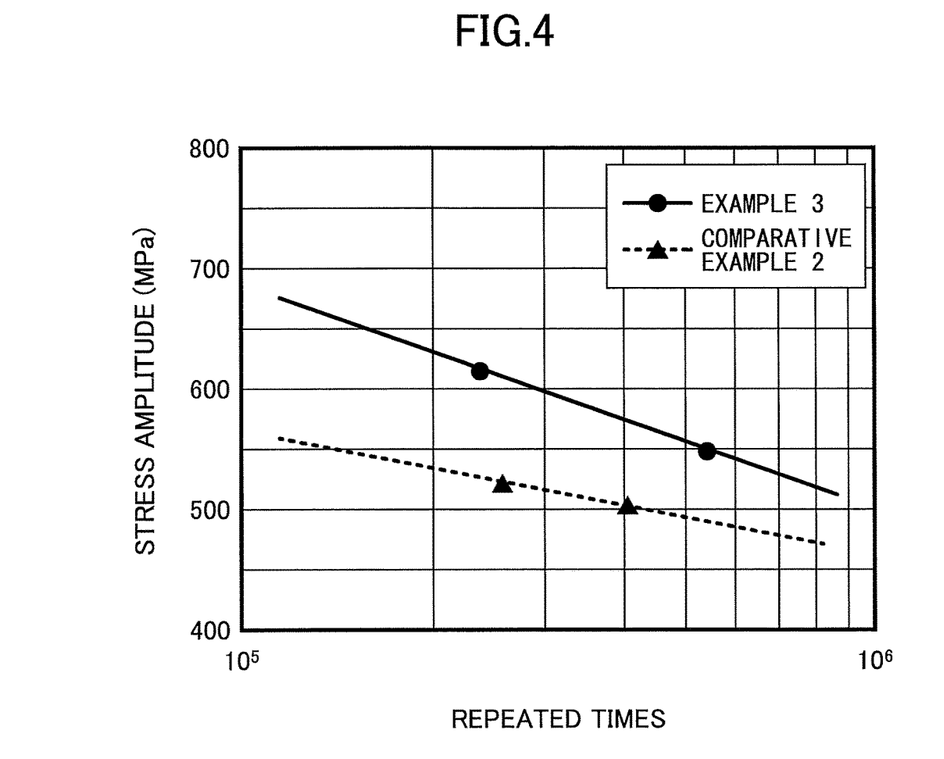
FIG. 4 is a view illustrating results of a durability test of example 3 and comparative example 2.

FIG. 4 illustrates results of the durability test of example 3 and comparative example 2. In FIG. 4, a solid line illustrates the result of the durability test of example 3, and a broken line illustrates the result of the durability test of comparative example 2. As is apparent from FIG. 4, it was confirmed that the coil spring of example 3 had good durability compared with the coil spring of comparative example 2.

Although a preferred embodiment of the high strength spring has been specifically illustrated and described, it is to be understood that minor modifications may be made therein without departing from the spirit and scope of the invention as defined by the claims.

The present application is based on and claims the benefit of priorities of Japanese Priority Application No. 2016-205535 filed on Oct. 19, 2016, Japanese Priority Application No. 2017-061981 filed on Mar. 27, 2017, and Japanese Priority Application No. 2017-095054 filed on May 11, 2017, the entire contents of which are hereby incorporated by reference.

What is claimed is:

1. A spring whose tensile strength is greater than or equal to 1800 MPa containing, by mass %, C: 0.40 to 0.50%, Si: 1.00 to 3.00%, Mn: 0.30 to 1.20%, Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb: 0.005 to 0.150%, N: 0.0100 to 0.0200%, P: limited to be less than or equal to 0.015%, S: limited to be less than or equal to 0.010%, and the balance of Fe and inevitable impurities,
wherein a Nb-compound including at least one of Nb-carbide, Nb-nitride and Nb-carbonitride is included,
wherein a V-compound including at least one of V-carbide and V-carbonitride that is precipitated around the Nb-compound is included,
wherein the Nb-compound and the V-compound form complex precipitates,
wherein an average grain size of the complex precipitates is less than or equal to 1 μm, and
wherein the number of the complex precipitates per unit is greater than or equal to 0.100 mm$^2$.

2. A method of manufacturing the spring according to claim 1, the method comprising:
performing a quenching process in which quenching temperature is greater than or equal to 950° C. and less than or equal to 1000° C. and a tempering process in which tempering temperature is greater than or equal to 250° C. and less than 390° C., on a steel containing, by mass %, C: 0.40 to 0.50%, Si: 1.00 to 3.00%, Mn: 0.30 to 1.20%, Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb: 0.005 to 0.150%, N: 0.0100 to 0.0200%, P: limited to be less than or equal to 0.015%, S: limited to be less than or equal to 0.010%, and the balance of Fe and inevitable impurities,
wherein the V-compound including at least one of V-carbide and V-carbonitride is solid-dissolved in Fe at the quenching temperature, and thereafter, the V-compound is precipitated around the Nb-compound including at least one of Nb-carbide, Nb-nitride and Nb-carbonitride.

3. A steel for a spring whose tensile strength is greater than or equal to 1800 MPa, containing, by mass %, C: 0.40, C: 0.40 to 0.50%, Si: 1.00 to 3.00%, Mn: 0.30 to 1.20% Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb: 0.005 to 0.150%, N: 0.0100 to 0.0200%, F: limited to be less than or equal to 0.015%, S: limited to be less than or equal to 0.010%, and the balance of Fe and inevitable impurities, wherein a Nb-compound including at least one of Nb-carbide, Nb-nitride and Nb-carbonitride is included, wherein a V-compound including at least one of V-carbide and V-carbonitride that is precipitated around the Nb-compound is included, wherein the Nb-compound and the V-compound form complex precipitates, wherein an average grain size of the complex precipitates is less than or equal to 1 µm, and wherein the number of the complex precipitates per unit is greater than or equal to 100/mm².

4. A method of manufacturing the steel for the spring according to claim 3, the method comprising:

performing a quenching process in which quenching temperature is greater than or equal to 950° C. and less than or equal to 1000° C., and a tempering process in which tempering temperature is greater than or equal to 250° C. and less than 390° C., on the steel containing, by mass %, C: 0.40 to 0.50%, Si: 1.00 to 3.00%, Mn: 0.30 to 1.20%, Ni: 0.05 to 0.50%, Cr: 0.35 to 1.50%, Mo: 0.03 to 0.50%, Cu: 0.05 to 0.50%, Al: 0.005 to 0.100%, V: 0.05 to 0.50%, Nb: 0.005 to 0.150%, N: 0.0100 to 0.0200%, P: limited to be less than or equal to 0.015%, S: limited to be less than or equal to 0.010% and the balance of Fe and inevitable impurities, wherein the V-compound including at least one of V-carbide and V-carbonitride is solid-dissolved in Fe at the quenching temperature, and thereafter, the V-compound is precipitated around the Nb-compound including at least one of Nb-carbide, Nb-nitride and Nb-carbonitride.

* * * * *